Dec. 10, 1957  A. Y. DODGE  2,815,838
ONE WAY CLUTCH
Filed April 27, 1953  2 Sheets-Sheet 1

Inventor:
Adiel Y. Dodge,
By Dawson, Orms, Brithers Spangenberg,
Attorneys.

Dec. 10, 1957     A. Y. DODGE     2,815,838
ONE WAY CLUTCH
Filed April 27, 1953     2 Sheets-Sheet 2
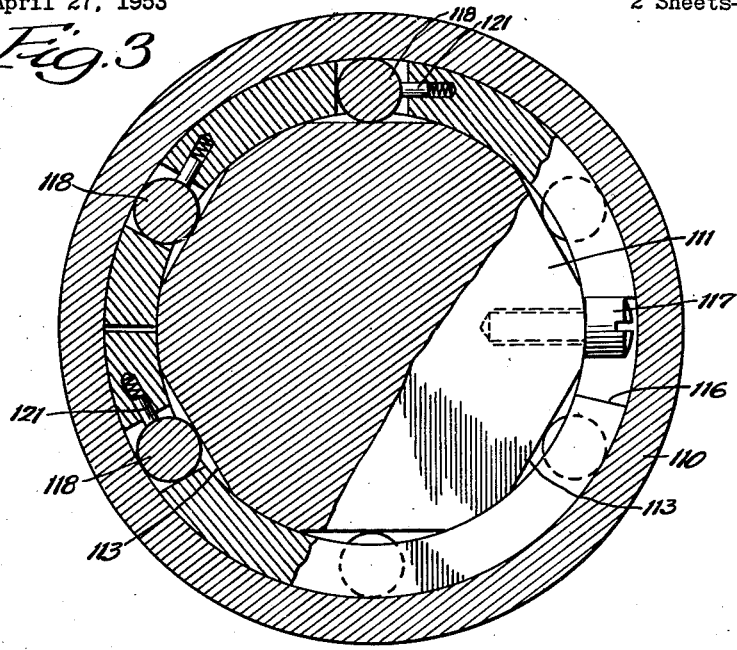
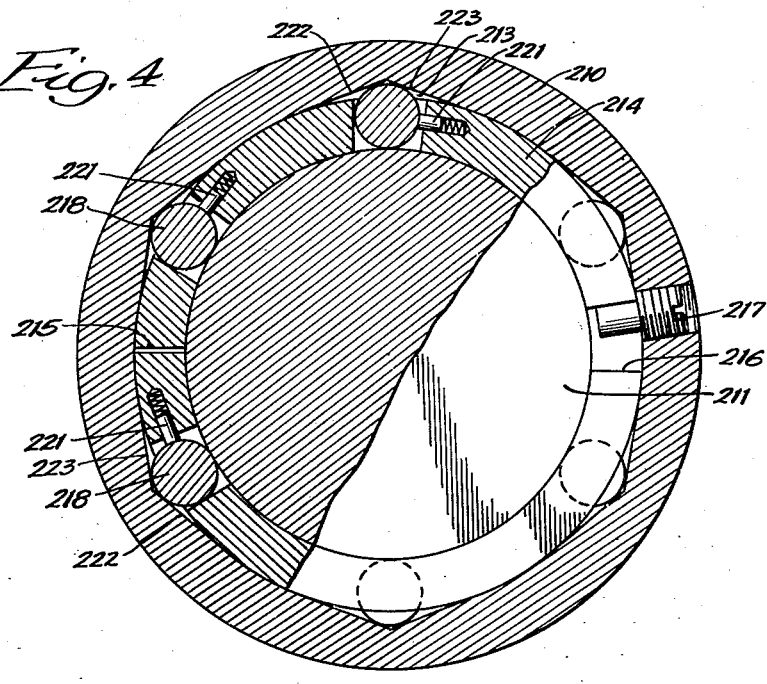
INVENTOR:
Adiel Y. Dodge,
BY
Bair, Freeman & Molinare
ATTORNEYS.

United States Patent Office 2,815,838
Patented Dec. 10, 1957

2,815,838
ONE WAY CLUTCH
Adiel Y. Dodge, Rockford, Ill., assignor to Borg-Warner Corporation, Chicago, Ill., a corporation of Illinois
Application April 27, 1953, Serial No. 351,375
3 Claims. (Cl. 192—45)

This invention relates to one way clutches and more particularly to a one way clutch of the roller and cam type to prevent relative rotation between races in one direction while permitting free rotation in the opposite direction.

One way clutches of the roller and cam type have heretofore been proposed but have generally used springs urging the rollers toward their engaged position relative to the cam surfaces. This produces a high rate of wear on the rollers during overrunning thereby substantially shortening the effective life of the clutch. Actually in such constructions the springs are compressed to a greater extent during overrunning than during gripping so that a relatively high spring pressure acts on the rollers during overrunning to produce wear.

It is one of the objects of the present invention to provide a one way clutch of the roller and cam type in which the pressure between the roller and the race surfaces is relieved during overrunning to minimize wear.

Another object is to provide a one way clutch in which the rollers are controlled by a cage having frictional engagement with one of the races to hold the roller at the low spot on the cam during overrunning. According to one feature of the invention the cage is connected to the other race through a lost motion connection to limit relative rotation therebetween.

Still another object is to provide a one way clutch in which the roller is controlled by an annular split cage biased into frictional engagement with the smooth race to provide a light frictional drag sufficient to control the roller.

A further object is to provide a one way clutch of the roller and cam type which is constructed to function as a bearing during overrunning of the races.

A still further object is to provide a one way clutch in which the rollers are urged toward their engaging position by springs anchored to the cage and the tension of the springs is varied by shifting of the cage from maximum during gripping to minimum during overrunning.

According to one feature, the cage positively shifts the rollers to their releasing position during overrunning and acts individually on the rollers through springs to urge the grippers into their engaging positions.

Figure 1:
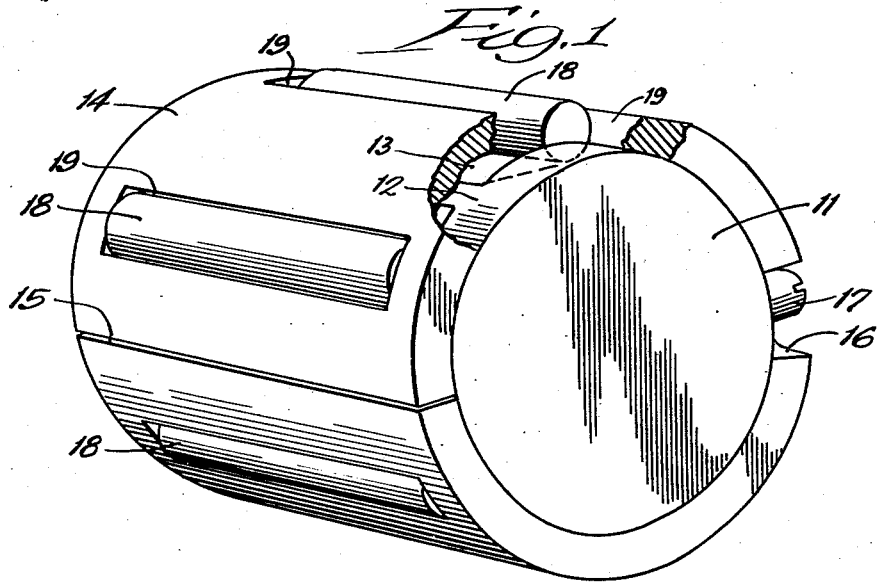
Figure 2:
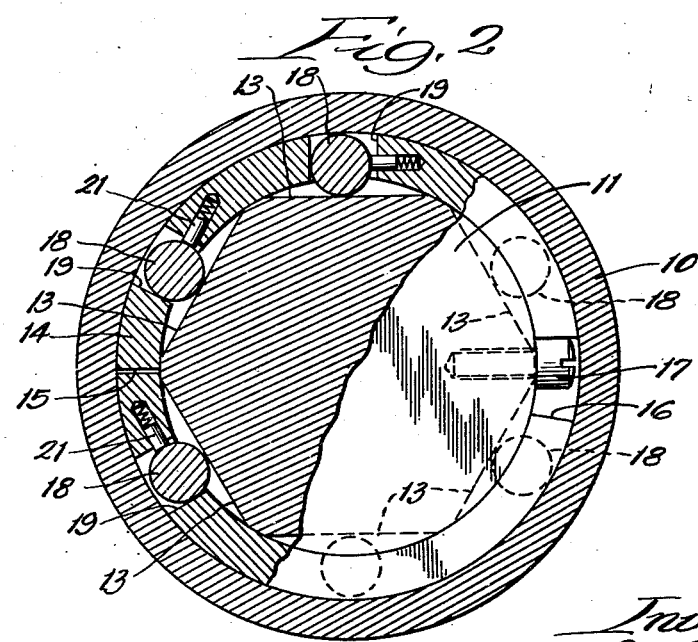

The above and other objects and advantages of the invention will be more readily apparent when read in connection with the accompanying drawing, in which Figure 1 is a perspective view of the cage and inner race assembly with parts of the cage broken away;

Figure 2 is a transverse section of a complete one way clutch embodying the invention with parts in elevation; and Figures 3 and 4 are views similar to Figure 2 of modifications.

The clutch, as shown in Figures 1 and 2, is adapted to connect an outer annular race 10 having a smooth cylindrical internal surface with an inner race 11. The inner race is substantially smaller than the outer race and is coaxial therewith to leave between them a space for the clutch parts. As shown, the inner race is formed with cylindrical end portions 12 and is formed between the end portions with flat cam surfaces 13 separated by cylindrical lands. It will be apparent that instead of flat cam surfaces any surface which is eccentric with respect to the annular end portions 12 and forms a locking angle would be satisfactory, the flat surfaces being preferred since they are easily and inexpensive to form.

Between the inner and outer races there is mounted an annular cage 14 which has smooth cylindrical surfaces to ride on the cylindrical lands and the cylindrical end portions 12 of the inner race and which is of a thickness to engage the inner surface of the outer race. Thus the cage provides an effective bearing between the inner and outer races on which they may turn freely during overrunning. The cage is split at one side, as indicated at 15, so that it is flexible radially and is biased outward into light frictional engagement with the outer race. Thereby during overrunning the cage tends to turn with the outer race.

To limit the extent of turning of the cage, it is formed with an elongated notch or opening 16 into which a pin 17 carried by the inner race fits. The pin 17 is substantially smaller circumferentially than the notch 16 so that the cage may have a limited amount of rotation between an engaging and an overrunning position relative to the inner race.

A series of rollers 18 are carried by the cage and fit loosely through openings 19 formed therein. Preferably spring pressed plungers 21 are carried by the cage and urge the rollers toward one side of the openings as seen in Figure 2.

When the outer race 10 is turning clockwise relative to the inner race, the parts will be in their overrunning position shown in Figure 2. At this time, the outer race tends to turn the cage clockwise until the upper end of the groove 16 engages the pin 17 to stop turning of the cage on the inner race. In this position of the cage and inner race, the rollers 18 are positively held by the cage in registry with the low spots on the cam surfaces so that they are either out of engagement with the outer race or are in very light engagement therewith. So long as overrunning continues with the outer race turning clockwise the parts will remain in this position. It will be noted that the rollers are not loaded so that wear thereon is minimized and the races can run freely relative to each other.

As soon as the outer race starts to turn counter-clockwise, it will turn the cage with it to the extent permitted by the lost motion connection 16, 17, moving the rollers toward the high portion of the cam surface and wedging them between the cam surfaces and the outer race. The springs 21 will be compressed to some extent at this time and will hold all of the rollers uniformly in engagement with the cam surfaces in spite of slight irregularities in the spacing or formation of the cage or cam surfaces. Thus the clutch will engage rapidly and uniformly to lock the races against relative rotation.

The longitudinally extending sides of the openings 19 are spaced apart a distance slightly greater than the diameter of the rollers 18. This distance limits the circumferential movement of the rollers relative to the cage 14 and about the axis of the inner race 11, i. e., the rollers 18 are limited to an increment of circumferential movement relative to the cage 14 as is defined by the distance between the sides of the opening 19 minus the diameter of the roller 18. This increment is less than the distance required for the roller 18 to move from wedging engagement to disengagement. Therefore, even if the roller 18 should move this increment within the opening 19 while in a disengaged position, engagement would not occur.

The construction, as shown in Figure 3, is generally similar to that of Figures 1 and 2, except that the cylindrical end portions 12 of the inner race are omitted and the flat cam surfaces are cut through the complete axial length of the inner race. In this construction, wherein parts corresponding to like parts in Figures 1 and 2 are indicated by the same reference numerals plus 100, the cam surfaces are either reduced in number or in circumferential extent to leave wider cylindrical lands between the cam surfaces upon which the cage is solely supported. With lands of this type, the cage is supported for free turning movement on the inner race and at the same time is adequately held between the openings 116 therethrough during overrunning so that it will not be deformed by bearing pressures thereon. Otherwise, this construction functions in exactly the same manner as Figures 1 and 2.

Figure 4 illustrates an alternative construction wherein the cam surfaces are formed in the outer race and parts therein corresponding to like parts in Figures 1 and 2 are indicated by the same reference numerals plus 200.

In this construction, the outer race has a cylindrical inner surface interrupted at spaced points by cam recesses 213 which are formed by surfaces 222 and 223 which form locking angles with the inner surface of the race at spaced points therein and which intersect along a line lying radially beyond a continuation of the cylindrical inner surface of the race. Surfaces 222 may be curvilinear to form a uniform wedge angle with the inner race, if desired.

In this construction, the cage 214 is split at 215 and is resiliently biased into frictional engagement with the cylindrical inner race so that it tends to turn therewith. The cage is formed with an opening 216 and the outer race carries a pin 217 which projects into the opening and is substantially smaller than the opening so that the cage can have limited turning movement between engaging and overrunning positions with respect to the outer race.

The parts are shown in the overrunning position wherein the inner race tends to turn clockwise relative to the outer race. At this time, the cage will be turned clockwise to the extent permitted by the pin relative to the outer race to bring the rollers 218 into registry with the low spots of the cam surfaces in alignment with the line of intersection between the two flat surfaces 222 and 223. Under these conditions, there is no pressure on the rollers so that the parts can turn freely relative to each other without wearing flat spots on the rollers. It will be noted that in this construction, the cage is supported on the cylindrical lands between the cam surfaces on the outer race and acts as a bearing between the races in the same manner as in Figure 3.

Upon rotation of the inner race in a counterclockwise direction, the cage will be carried counterclockwise relative to the outer race to the extent permitted by the slot 216 and pin 217. At this time, the spring members 221 will be compressed to urge the rollers against the high spots of the cam surfaces and to wedge the rollers uniformly between the cam surfaces and the cylindrical surface of the inner race.

In this construction, the cam surfaces preferably extend through the complete axial length of the outer race and can be formed easily and inexpensively by an operation, such as broaching. For many purposes it is desirable to provide the cam surfaces on the outer race so that the centrifugal force acting on the rollers during rotation will not press them against the smooth cylindrical race surface and produce wear.

This application is a continuation-in-part of my copending application Serial No. 9,459, filed February 19, 1948, now abandoned.

While several embodiments of the invention have been shown and described in detail herein, it will be understood that these are illustrative only and are not to be taken as a definition of the scope of the invention, reference being had for this purpose to the appended claims.

What is claimed is:

1. A one way clutch comprising inner and outer coaxial races, one of the races having a cylindrical surface and the other being formed with a plurality of spaced cam surfaces lying at acute angles to the cylindrical surface, an annular cage fitting between and rotatable relative to both of the races and formed with openings therethrough corresponding in number and spacing to the cam surfaces, a roller fitting in each opening for free radial movement, means on said cage limiting the circumferential movement of each roller about the axis of said inner race relative to the cage to an amount less than that required for the roller to move from wedging engagement with a high part of the cam to a disengaged position in registry with the low part of the cam, circumferentially spaced interengaging parts on the cage and said other race to limit relative movement thereof to one extreme position in which the rollers are in wedging engagement with high parts of the respective cam surfaces and a second extreme position in which the rollers are held in registry with the low parts of the cams, said other race being formed with cylindrical lands between the cam surfaces on which the cage is supported for limited rotating movement, and the cage being formed with inner and outer cylindrical surfaces slidably engaging the cylindrical lands and the cylindrical surface of the other race to act as a bearing between the races.

2. A one-way clutch comprising inner and outer coaxial races together providing first and second facing race surfaces constructed and arranged to provide non-constant radial spacing therebetween, cage means disposed between said race surfaces frictionally engaging one of said race surfaces and rotatable relative thereto, means defining openings in said cage, roller means in said cage openings adapted to wedgingly engage between said race surfaces in one position of said roller means and adapted to permit relative rotation between said race surfaces in another position thereof, lost motion means interconnecting said cage and said other race adapted to restrict rotation of said cage relative to said other race to a distance corresponding to the spacing between the engaged and disengaged positions of said rollers, said opening defining means in said cage being constructed and arranged to restrict movement of said roller means relative to said cage means to an amount less than the amount of movement of said cage means relative to said other race permitted by said lost motion means.

3. A one-way clutch comprising inner and outer coaxial races together providing first and second facing race surfaces constructed and arranged to provide non-constant radial spacing therebetween, cage means disposed between said race surfaces frictionally engaging one of said race surfaces and rotatable relative thereto, means defining openings in said cage, roller means in said cage openings adapted to wedgingly engage between said race surfaces in one position of said roller means and adapted to permit relative rotation between said race surfaces in another position thereof, lost motion means interconnecting said cage and said other race adapted to restrict rotation of said cage relative to said other race to a distance corresponding to the spacing between the engaged and disengaged positions of said rollers, said opening defining means in said cage being constructed and arranged to restrict movement of said roller means relative to said cage means to an amount less than the amount of movement of said cage means relative to said other race permitted by said lost motion means, said cage means being constructed and arranged to space said race surfaces whereby said cage means functions as a bearing between the races.

References Cited in the file of this patent

UNITED STATES PATENTS

| | | |
|---|---|---|
| 2,172,653 | Flogaus | Sept. 12, 1939 |
| 2,332,061 | Conkle | Oct. 19, 1943 |
| 2,393,693 | Kelbel | Jan. 29, 1946 |
| 2,504,173 | Banker | Apr. 18, 1950 |
| 2,543,385 | Tarlton | Feb. 27, 1951 |